UNITED STATES PATENT OFFICE.

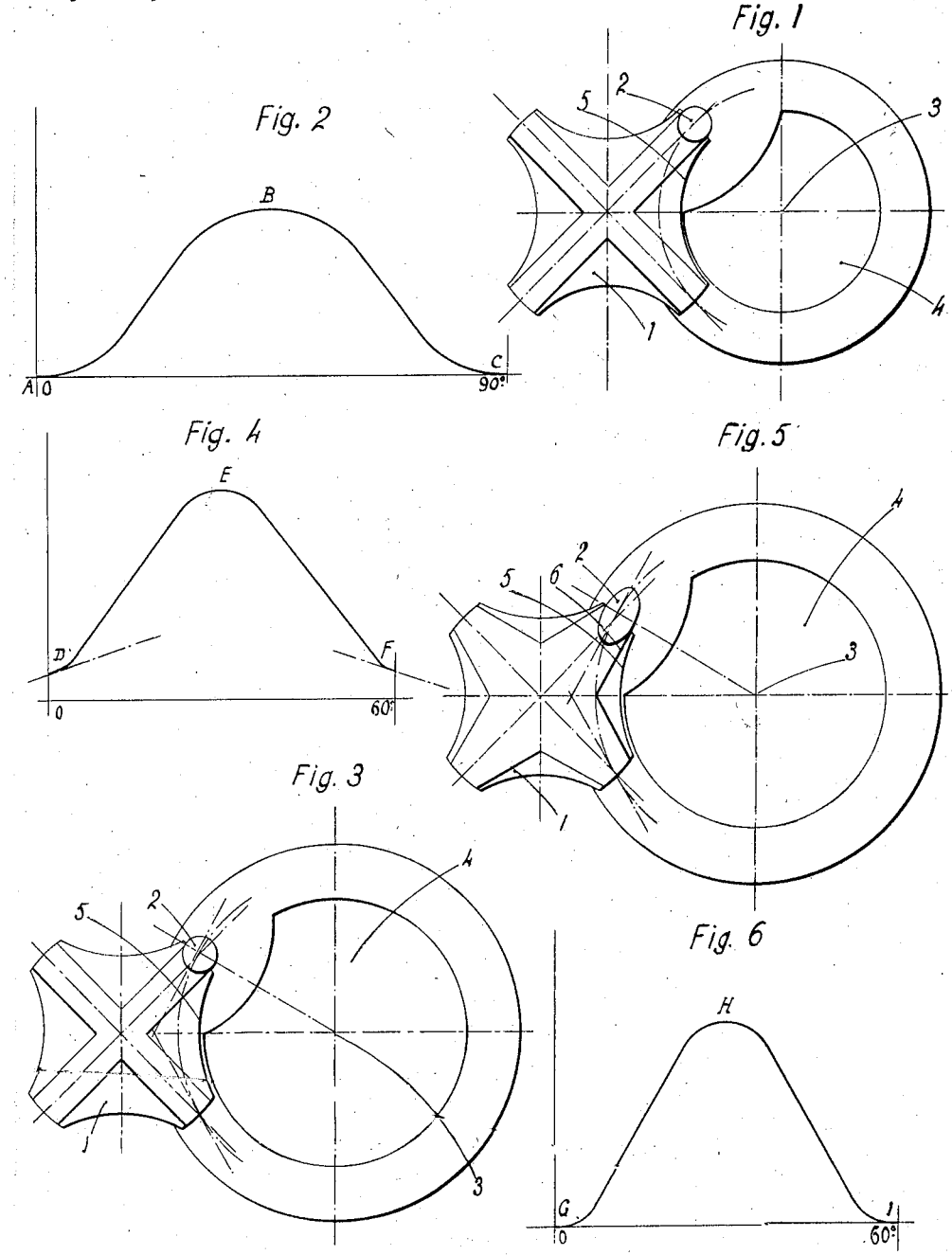

MAURICE FIGOUR, OF PARIS, FRANCE, ASSIGNOR TO ETABLISSEMENTS CONTINSOUZA, SOCIÉTÉ ANONYME, OF PARIS, FRANCE, A CORPORATION OF FRANCE.

STAR-WHEEL TRANSMISSION.

1,338,823.     Specification of Letters Patent.     Patented May 4, 1920.

Application filed January 6, 1919. Serial No. 269,838.

*To all whom it may concern:*

Be it known that I, MAURICE FIGOUR, citizen of the French Republic, residing at Paris, Department of the Seine, in France, have invented certain new and useful Improvements in Star-Wheel Transmissions; and I do hereby declare the following to be a full, clear, and exact description of the invention, such as will enable others skilled in the art to which it appertains to make and use the same.

The invention relates to an improved star wheel transmission or Geneva movement, particularly adapted for use in cinematographic machines and has for its object to provide a device of the character described, adapted to produce the desired differential angular movement between the driving and driven member, such for example as a 90° movement of the driven member with a concurrent 60° movement of the driving member, the operation of the mechanism being effected without the usual shock and highly accelerated initial and terminal movements of the driven member when the pin on the driving member engages and leaves the driven member. To this end, the invention comprises a driving member provided with a pin, preferably elliptical in cross section, and a driven member having radial grooves or channels therein, with which said pin coöperates, the sides of the grooves, which are engaged by the pin being preferably normal to the minor axis of the elliptical pin, when so engaged, and disposed at an angle to the longitudinal axis of the corresponding channel, substantially equal to one-half the difference between the angular movements of driven and driving members during operative engagement of the latter, so that said channels when formed with homologous sides will diverge toward the center of the driven member, the angle of divergence being equal to the difference between the angular movements of the two elements aforesaid, throughout their operative relation.

Referring to the accompanying drawings,

Figure 1 is a plan view of an ordinary star wheel transmission involving a cylindrical pin on the driver and parallel-sided channels on the driven element.

Fig. 2 is a curve or diagram, the abscissæ of which are equal to the speeds of the pin and the ordinates to the corresponding speeds of the driven member or star wheel when the angular movements of the two elements are equal.

Fig. 3 is a plan view of a similar transmission in which the relative angular movements of the driving and driven elements vary in relation of 60° and 90° respectively.

Fig. 4 is a diagram similar to that shown in Fig. 2, indicating the relative speed curve developed by the form shown in Fig. 3.

Fig. 5 is a plan view of a transmission involving the present invention.

Fig. 6 is a diagram similar to Figs. 2 and 4, showing the relative speed curve of the device shown in Fig. 5.

In the operation of cinematographic machines, which usually involve a star wheel transmission, one member of which operates the film intermittently and the other of which actuates the shutter continuously, it is necessary and desirable to avoid undue strain on the film when the latter begins its movement and undue momentum on the mechanism when the film movement is arrested, and also to avoid so-called flickering. More or less complicated forms of apparatus have been designed to effect these results, namely to insure a relatively slow starting and stopping of the film and an intermittent angular movement of the film driving element which will be less than the angular movement of the shutter operating mechanism, whereby projection of the image or picture will be prevented while the film is moving. The present invention involves a very simple, durable and efficient device to effect both of these objects, namely to eliminate the accelerated speed of the driven member at the beginning and ending of operative engagement with the driving member and to produce a relative angular movement of the driven member less in extent than that of the driving member.

Fig. 1 of the drawing illustrates an ordinary type of star wheel transmission, in which the angular movement of the driving and driven member are the same, that is to say, an angular movement of 90° of the cylindrical pin 2, when the latter engages the star wheel 1, moves the latter through an angle of 90°. Inasmuch as the sides of the channels 6 of the star wheel are parallel and therefore substantially tangential to the lateral surface of the pin 2, there is no abnormal acceleration or jerking of the mechanism at the beginning and ending of the successive movements of the star wheel, but with a device of this character, it is impossible to prevent the objectionable flickering of the light as the extent of movement of the shutter or obturator is exactly the same as that of the star wheel 1 which drives the film.

In the form of apparatus shown in Fig. 2, the latter objection is overcome, but the objectionable jerking or rapid acceleration of the star wheel at the beginning and ending of its successive movement is accentuated, so that undue stress is placed upon the film, when the latter begins its movement, and an undue momentum is given to the mechanism at the instant the film should be brought to rest. In this form of apparatus, while the star wheel 1 moves through an angle of 90°, the pin 2 moves through a lesser angle, or approximately 60°. It will be noted, however, that the engaging side of the groove 6 is not tangential to the lateral surface of the pin 2, but as a matter of fact forms an angle of approximately 15° with the true tangent normal to a radius through the center of the pin and the center of the shaft 3, or in other words, the path of movement of the center of the pin at the point of entrance into the groove makes an angle of substantially 15° with the longitudinal axis of the groove or channel. In order to prevent perceptible jerking or rapid accelerating of the star wheel when the pin engages and leaves the groove, it is necessary that the engaging side of the groove be tangential to the pin at the point of engagement. It is because of the lack of this coordination and relation that the apparatus illustrated in Fig. 4 has been found objectionable and does not give satisfactory results.

As indicated, the apparatus shown in Fig. 5, constructed in accordance with the present invention, is specifically designed to obviate the objections inherent in the two forms previously described. Referring to Fig. 5, 1 indicates the star wheel provided with radial grooves 6, in the present case four in number, with which coöperates a pin 2, preferably elliptical in cross section, mounted upon the driving shaft or member 3, which latter is provided with the usual type of disk 4, the periphery of which engages the concaved sides of the star wheel while the latter is at rest, and which disk is provided with a segmental recess to permit the necessary rotatory movement of the star wheel, when the latter is engaged by the pin.

The sides of the grooves 6 or at least the sides 6' of the respective grooves which coöperate with the pin 2, are not parallel as in the ordinary case of star wheel grooves or channels, but, on the contrary, are disposed at an angle to each other as indicated. In other words, the side 6' of each groove 6 forms an angle, opening or diverging toward the center of the star wheel of approximately 15°, so that if the two sides of each groove are homologous, they form an angle of substantially 30°, diverging toward the center of the star wheel.

As indicated, the pin 2 is elliptical in cross section with its major axis substantially parallel with the driving face or side of the groove 6', so that its minor axis is substantially normal to said side 6', and it is by virtue of this construction and relation of the coacting sides of the grooves and pin that the sudden acceleration of the star wheel at the beginning and ending of its intermittent movement is completely eliminated, and the acceleration and retardation of the movement of the star wheel is gradual and regular, so that no undue strain is put upon the film and the latter comes to rest smoothly and evenly at the end of the movement of the star wheel.

It will be noted, however, that the relation of the star wheel 1 to the driving element 3 is such that the intermittent angular movement of the star wheel is greater than the angular movement of the pin 2, during the engagement of the pin with a given groove of the star wheel, in the form shown the star wheel moving through 90° for each actuation, while the pin 2 moves through 60°. The coöperating side 6' of each groove or channel 6 being tangential to the lateral surface of the pin 2, the characteristic curve H, G, I, shown in Fig. 6 indicates that the initial and final movements of the star wheel are slow and increase and decrease gradually so that no undue shocks or strains are put upon the film or other parts of the apparatus. In other words, the curve H, G, I being tangent to the abscissæ at both ends indicates that the relative speeds of the star wheel and the pin on the driving element are such as to eliminate shocks or sudden accelerations of the star wheel when the pin enters or leaves a given groove, so that the apparatus works smoothly and uniformly, both as to the avoidance of shocks and the elimination of the objectionable flickering.

Practical considerations render it necessary to provide a little clearance between the pin 2 and the coöperating sides of the respective grooves, so that the tangential relation of the groove sides to the pin is approximate and not necessarily absolute.

It will be understood that the number of grooves or channels in the star wheel may be varied at will and in accordance with the desired angular movements to be imparted to the star wheel, and that therefore the particular type of star wheel involving four grooves or channels in cross-like arrangement is merely exemplary of that usually employed in cinematographic apparatus.

The material advantage of the particular type of transmission, involving the present invention, is the fact that the transmission may be designed in order to satisfy any selected relation of speeds of the driving and driven elements, that is to say, by laying out a curve along the general lines indicated in Fig. 6, in which the abscissæ represent the angular speeds of the pin and the ordinates the corresponding speeds of the star wheel, the component parts of the apparatus may be designed to effect the desired results.

What I claim is:—

1. A star wheel transmission comprising a pin-carrying driving member and a channeled driven member, the pin engaging sides of the respective channels forming an acute angle with the longitudinal axis of the corresponding channel equal to one-half the difference between the angular movements of the driven and driving members during operative engagement of the latter.

2. A star wheel transmission comprising a pin-carrying driving member and a channeled driven member, the channels having sides which diverge toward the center of the driven member, and said pin being elliptical in cross section with its minor axis normal to the engaging side of the coöperating channel.

3. A star wheel transmission comprising a pin-carrying driving member and a driven member having radial channels, the sides of which are disposed at an angle to the longitudinal axis of the groove equal to one-half the difference between the angular movements of the driven and driving members during operative engagement of the latter, the pin being elliptical in cross section with its minor axis normal to the engaging side of the coöperating channel.

In testimony whereof I affix my signature.

MAURICE FIGOUR.